(12) United States Patent
Liang et al.

(10) Patent No.: US 11,522,214 B2
(45) Date of Patent: Dec. 6, 2022

(54) LITHIUM-ION BATTERIES AND RELATED BATTERY MODULES, BATTERY PACKS AND DEVICES

(71) Applicant: Contemporary Amperex Technology Co., Limited, Ningde (CN)

(72) Inventors: Chengdu Liang, Ningde (CN); Cuiping Zhang, Ningde (CN); Changlong Han, Ningde (CN); Ming Zhang, Ningde (CN); Peipei Chen, Ningde (CN); Hailin Zou, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 17/320,258

(22) Filed: May 14, 2021

(65) Prior Publication Data

US 2022/0021020 A1    Jan. 20, 2022

Related U.S. Application Data

(63) Continuation of application No. PCT/CN2020/107439, filed on Aug. 6, 2020.

(30) Foreign Application Priority Data

Sep. 24, 2019  (CN) .......................... 201910904622.X

(51) Int. Cl.
*H01M 10/0525* (2010.01)
*H01M 10/04* (2006.01)
(Continued)

(52) U.S. Cl.
CPC ....... *H01M 10/0525* (2013.01); *H01M 4/131* (2013.01); *H01M 10/0413* (2013.01);
(Continued)

(58) Field of Classification Search
CPC ......... H01M 10/0525; H01M 10/0567; H01M 10/0568; H01M 10/0585; H01M 4/131; H01M 2220/20
See application file for complete search history.

(56) References Cited

U.S. PATENT DOCUMENTS

2017/0309960 A1\* 10/2017 Lim .................. H01M 10/0569

FOREIGN PATENT DOCUMENTS

| CN | 102471835 A | 5/2012 |
|---|---|---|
| CN | 102986066 A | 3/2013 |

(Continued)

OTHER PUBLICATIONS

Interrnational Search Report for PCT Application No. PCT/CN2020/107439, dated Nov. 11, 2020, 13 pages.
(Continued)

*Primary Examiner* — Osei Kamponsah
(74) *Attorney, Agent, or Firm* — East IP P.C.

(57) ABSTRACT

This application relates to lithium-ion batteries and related battery modules, battery packs and devices. Specifically, the lithium-ion battery includes a positive electrode plate, a negative electrode plate, an electrolyte, and a separator, wherein the positive electrode plate includes aluminum foil as a positive electrode current collector, and a content of element copper atom as an impurity per unit area of the aluminum foil is from 0.009 g/m$^2$ to 0.021 g/m$^2$, and the electrolyte contains first lithium salt and additive A, and the first lithium salt is a fluorine-containing sulfonimide lithium salt, and relative to total molar amount of lithium salt in the electrolyte, the fluorine-containing sulfonimide lithium salt has a molar amount of 30 mol % or higher; and the additive A is at least one of a phosphate compound containing an
(Continued)

unsaturated bond, a cyclic compound containing a —SO$_2$— bond and a silicon-oxygen compound containing an unsaturated bond.

17 Claims, 2 Drawing Sheets

(51) Int. Cl.
    *H01M 10/0585*     (2010.01)
    *H01M 10/0568*     (2010.01)
    *H01M 10/0567*     (2010.01)
    *H01M 10/0569*     (2010.01)
    *H01M 4/131*     (2010.01)
    *H01M 4/02*     (2006.01)

(52) U.S. Cl.
    CPC ... *H01M 10/0567* (2013.01); *H01M 10/0568* (2013.01); *H01M 10/0569* (2013.01); *H01M 10/0585* (2013.01); *H01M 2004/028* (2013.01); *H01M 2220/20* (2013.01); *H01M 2300/0028* (2013.01)

(56) References Cited

FOREIGN PATENT DOCUMENTS

| | | |
|---|---|---|
| CN | 103003457 A | 3/2013 |
| CN | 103503209 A | 1/2014 |
| CN | 103579668 A | 2/2014 |
| CN | 104611616 A | 5/2015 |
| CN | 108461808 A | 8/2018 |
| CN | 109935756 A | 6/2019 |
| CN | 110021785 A | 7/2019 |
| CN | 110212153 A | 9/2019 |
| EP | 2800197 A1 | 11/2014 |
| EP | 3537513 A1 | 9/2019 |
| JP | 2013007092 A | 1/2013 |

OTHER PUBLICATIONS

The notice of allowance and supplementary search report dated Oct. 11, 2021 for Chinese application No. 201910904622.X, 7 pages.
The extended European search report for European Application No. 20867125.5, dated Mar. 18, 2022, 5 pages.

* cited by examiner

LITHIUM-ION BATTERIES AND RELATED BATTERY MODULES, BATTERY PACKS AND DEVICES

CROSS-REFERENCES TO RELATED APPLICATIONS

This application is a continuation of International Application No. PCT/CN2020/107439, filed on Aug. 6, 2020, which claims priority to Chinese Patent Application No. 201910904622.X, titled "LITHIUM-ION BATTERY" and filed on Sep. 24, 2019, which is incorporated herein by reference in their entireties.

TECHNICAL FIELD

This application belongs to the field of electrochemical technology. More specifically, this application relates to a lithium-ion battery and related battery module, battery pack and device.

BACKGROUND

Lithium-ion batteries are widely used in electric vehicles and consumer products due to their high-voltage platform, low self-discharge, high output power, no memory effect, long cycle life and low environmental pollution.

With the expansion of the application range, especially with the popularization of smart phones and electric vehicles, the demand for high-energy density lithium-ion batteries is increasing. The energy density of the battery can be increased in the following two ways: (1) increasing nickel content in positive electrode material of battery, (2) increasing the charging voltage of battery. In recent years, high-nickel positive electrode materials have been widely used to replace traditional lithium cobalt positive electrode materials to increase the energy density of batteries in the industry.

SUMMARY

A first aspect of the present application provides a lithium-ion battery, including a positive electrode plate, a negative electrode plate, an electrolyte, and a separator, wherein the positive electrode plate includes aluminum foil as a positive electrode current collector, and a content of element copper atom as an impurity per unit area of the aluminum foil is from 0.009 $g/m^2$ to 0.021 $g/m^2$, and the electrolyte contains a first lithium salt and additive A, and the first lithium salt is a fluorine-containing sulfonimide lithium salt, and relative to total molar amount of lithium salt in the electrolyte, the fluorine-containing sulfonimide lithium salt has a molar amount of 30 mol % or higher; the additive A is at least one of a phosphate compound containing an unsaturated bond, a cyclic compound containing a $-SO_2-$ bond and a silicon-oxygen compound containing an unsaturated branch chain.

In any lithium-ion battery described in the above first aspect, the additive A may have a reduction potential in the electrolyte ranging from 1.2 V to 0.6 V.

In any lithium-ion battery as described above, the electrolyte may have an infiltration coefficient on the surface of the positive electrode plate ranging from 0.9 μg/s to 3.0 μg/s.

In any lithium-ion battery as described above, the electrolyte may have a viscosity at 25±3° C. of less than or equal to 5 mPa·s.

In any lithium-ion battery as described above, the fluorine-containing sulfonimide lithium salt may be a lithium salt having Formula 1,

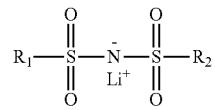

Formula 1 wherein $R_1$ and $R_2$ are each independently a fluorine atom or a hydrocarbon group having 1 to 8 carbon atoms optionally substituted by fluorine, and at least one of $R_1$ and $R_2$ contains fluorine; and optionally, $R_1$ and $R_2$ are each independently a fluorine atom, $-CH_3$, $-CF_3$, $-C_2F_5$, $-C_3F_7$, $-C_4F_9$ or $-CF_2CF_2OCF_2CF_3$.

In any lithium-ion battery as described above, the phosphate compound containing an unsaturated bond may include at least one of compounds of Formula 2,

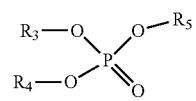

Formula 2 wherein $R_3$, $R_4$ and $R_5$ are each independently one selected from alkenyl, alkynyl, haloalkyl, haloalkenyl, haloalkynyl and alkyl groups having 1 to 6 carbon atoms, and aryl and haloaryl groups having 6 to 10 carbon atoms; and at least one of $R_3$, $R_4$ and $R_5$ contains an unsaturated bond; optionally, $R_3$, $R_4$ and $R_5$ have at least one branch chain having an end of a carbon-carbon unsaturated bond; and further optionally, all of branch chains in $R_3$, $R_4$ and $R_5$ have an end of a carbon-carbon unsaturated bond.

In any lithium-ion battery as described above, the cyclic compound containing a $-SO_2-$ bond may be at least one of compounds of Formula 3 to Formula 5,

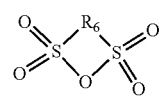

Formula 3

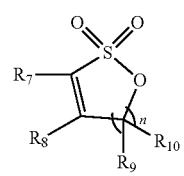

Formula 4

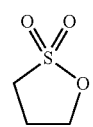

Formula 5 wherein $R_6$ is one selected from alkylene, alkenylene, alkynylene, halogenated alkylene, halogenated alkenylene, and halogenated alkynylene having 2 to 4 carbon atoms; and arylene and halogenated arylene having 6 to 10 carbon atoms;

$R_7$, $R_8$, $R_9$ and $R_{10}$ are each independently one selected from H, alkyl, alkenyl, alkynyl, haloalkyl, haloalkenyl, and haloalkynyl having 1 to 6 carbon atoms; and aryl and halogenated aryl having 6 to 10 carbon atoms; n is 1, 2 or 3.

In any lithium-ion battery as described above, the silicon-oxygen compound containing an unsaturated branch chain may be a compound of Formula 6, Formula 6

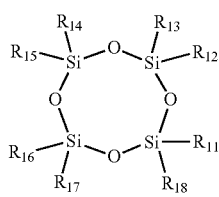

wherein $R_{11}$, $R_{12}$, $R_{13}$, $R_{14}$, $R_{15}$, $R_{16}$, $R_{17}$, and $R_{18}$ are each independently selected from hydrocarbon groups having 1 to 4 carbon atoms that are unsubstituted or substituted by a halogen element; and at least one of $R_{11}$, $R_{12}$, $R_{13}$, $R_{14}$, $R_{15}$, $R_{16}$, $R_{17}$, and $R_{18}$ contains an unsaturated bond.

In any lithium-ion battery as described above, relative to total weight of the electrolyte, mass percentage of the additive A may be from 0.01 wt % to 5 wt %.

In any lithium-ion battery as described above, the electrolyte may further include a second lithium salt, the second lithium salt is one or more selected from $LiPF_6$, $LiBF_4$, $LiSbF_6$, $LiAsF_6$, $LiClO_4$, $LiN(C_2F_5SO_2)_2$, $LiN(CF_3SO_2)_2$, $CF_3SO_3Li$, $LiC(CF_3SO_2)_3$ and $LiB(C_2O_4)_2$, optionally, molar ratio of the first lithium salt to the second lithium salt is in the range of from 1:1 to 20:1.

In any lithium-ion battery as described above, the positive electrode plate may contain a positive electrode active material including at least one of compounds represented by Formula 7 to Formula 9:

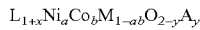 Formula 7

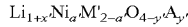 Formula 8

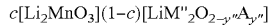 Formula 9 wherein each A is independently one or more of S, N, F, Cl, Br and I;
in Formula 7, $-0.1 \le x \le 0.2$, $0.5 \le a < 1$, $0.02 < b < 0.3$, $0.55 \le a+b < 1$, $0 \le y < 0.2$, M includes one or more of Mn, Fe, Cr, Ti, Zn, V, Al, Zr and Ce;
in Formula 8, $-0.1 \le x' \le 0.2$, $0.4 \le a' < 0.6$, $0 < y' < 0.2$, M' includes one or more of Mn, Fe, Cr, Ti, Zn, V, Al, Zr, Mg, and Ce;
in Formula 9, $0 < c < 1$, $0 \le y'' < 0.2$, M'' is one or more of Ni, Co and Mn, Fe, Cr, Ti, Zn, V, Al, Zr and Ce.

A second aspect of the present application provides a battery module, including any lithium-ion battery described in the above first aspect.

A third aspect of the present application provides a battery pack, including any battery module described in the above second aspect.

A fourth aspect of the present application provides a device including any lithium-ion battery described in the above first aspect.

The inventors found that overall performance of a battery core (also referred to as an electrode assembly) can be effectively improved by using an electrolyte including fluorine-containing sulfonimide lithium salt as the first lithium salt and additive A, and using a content of element copper atoms as an impurity per unit area of aluminum foil of a positive current collector within a specific range. Compared with the prior art, this application includes at least one or more of the following beneficial effects: significantly reduced discharge resistance at low temperature, high kinetic performance, reduced gas production after high temperature storage, long cycle life, and high energy density of battery. In particular, the inventors found that by using the specific combination of the present application, gas production of lithium-ion battery after storage at high temperatures (80° C. or higher) can be significantly reduced; cycle life becomes longer; and/or, kinetic performance at low temperature (−20° C. or lower) is improved.

BRIEF DESCRIPTION OF DRAWINGS

In order to explain the technical solutions of the embodiments of the present application more clearly, the following will briefly introduce the drawings that need to be used in the embodiments of the present application. Apparently, the drawings described below are only some embodiments of the present application. A person of ordinary skill in the art can obtain other drawings based on these drawings without creative work.

DESCRIPTION OF EMBODIMENTS

Figure 1:
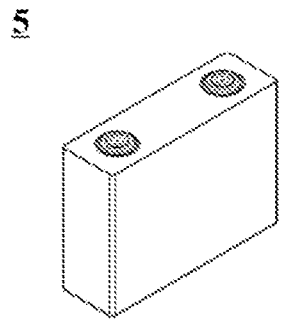
FIG. 1 is a schematic diagram of an embodiment of a secondary battery.

In the context of describing a group or compound herein, the term "optionally substituted" or "optional substituent" means to include two kinds of embodiments, including "substituted" and "unsubstituted". Likewise, the term "optionally fluorine-substituted" or "optionally substituted by fluorine" refers to two kinds of embodiments, including "substituted by fluorine" and "unsubstituted by fluorine". For example, optionally substituted alkyl groups include unsubstituted alkyl groups and alkyl groups substituted with one or more substituents.

In the context of describing a group or compound herein, the term "halogenated derivative" refers to a group or compound in which one or more hydrogen atoms are replaced by halogen atoms (for example, including chlorine, fluorine, and bromine). Optionally, the halogenated derivative is a fluorinated derivative. Further optionally, the fluorinated derivative is perfluorinated or partially fluorinated. For example, fluorinated derivatives of methyl may include $-CF_3$, $-CHF_2$ and $-CH_2F$.

The above summary of this application is not intended to describe each disclosed embodiment or every implementation in this application. The following description more specifically exemplifies illustrative embodiments. In many places throughout the application, guidance is provided through lists of examples. Those examples can be used in various combinations. In each instance, the recited list serves only as a representative group and should not be interpreted as an exhaustive list.

In actual practice, the inventors found that when the two ways to increase energy density of battery as mentioned in the Background are adopted, at least one of power performance, service life, and high-temperature storage performance of a battery is severely damaged. When the positive electrode active material is a high nickel positive electrode active material, the stability of the positive electrode structure is reduced due to the increased nickel content; and during cyclic storage process, the electrode/electrolyte interface is unstable, resulting in continuous oxidation and decomposition of the electrolyte on the positive electrode. When the charging voltage of battery is increased, the cathode potential is increased during charging, and the electrolyte is more likely to be oxidized and decomposed. It can be seen that the two ways to increase energy density of battery (including: increasing nickel content in positive electrode material of battery and increasing the charging voltage of battery) will lead to the increase of oxidation and decomposition of the electrolyte, and the electrolyte by-products cover the electrode/electrolyte interface, making the SEI film continues to thicken and the interface has an increased impedance, thereby deteriorating power performance of the battery.

Therefore, there is an urgent need to develop a lithium-ion battery that has improved battery capacity and kinetic performance, as well as long cycle life, higher power performance, and high-temperature storage performance.

An object of the present application is to provide a high-capacity battery with high kinetic performance, long cycle life and low high-temperature gas production.

The inventors found that by using the technical solution of the present application, one or more of the above-mentioned effects can be achieved.

The battery according to the present application will be described in detail below.

The first aspect of the present application provides a lithium-ion battery, comprising a positive electrode plate, a negative electrode plate, an electrolyte and a separator, wherein the positive electrode plate contains aluminum foil as a positive electrode current collector, and a content of element copper atom as an impurity per unit area of the aluminum foil is from 0.009 g/m² to 0.021 g/m², and the electrolyte contains a first lithium salt and additive A, the first lithium salt is a fluorine-containing sulfonimide lithium salt, and relative to the total molar amount of lithium salt in the electrolyte, the fluorine-containing sulfonimide lithium salt has a molar amount of 30 mol % or higher; the additive A is at least one of a phosphate compound containing an unsaturated bond, a cyclic compound containing a —SO₂— bond and a silicon-oxygen compound containing an unsaturated branch chain.

In some optional embodiments, the fluorine-containing sulfonimide lithium salt is a lithium salt having Formula 1,

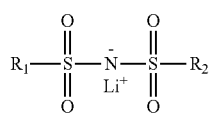

Formula 1 wherein R₁ and R₂ are each independently a fluorine atom or a hydrocarbon group having 1 to 8 carbon atoms optionally substituted by fluorine, and at least one of R₁ and R₂ contains fluorine. Optionally, R₁ and R₂ are each independently —C$_a$H$_b$F$_c$ or —CF₂CF₂(OCF₂CF₂)$_d$F, and a is an integer from 0 to 8, both b and c are integers, b+c=2a+1, and d is 1, 2, or 3. Further optionally, a is 0, 1, 2, 3, or 4. For example, R₁ and R₂ may be each independently fluorine atom and —CH₃, —CHF₂, —CH₂F, —CF₃, —C₂F₅, —C₃F₇, —C₄F₉ or —CF₂CF₂OCF₂CF₃.

Especially optionally, the fluorine-containing sulfonimide lithium salt is one or more selected from lithium bis(fluorosulfonyl)imide (LiFSI), lithium (fluorosulfonyl)(trifluoromethylsulfonyl) imide, lithium bis(trifluoromethylsulfonyl)imide (LiTFSI), lithium (methylsulfonyl)(trifluoromethylsulfonyl)imide, lithium (trifluoromethylsulfonyl)(pentafluoroethylsulfonyl)imide, lithium bis(pentafluoroethylsulfonyl)imide. For example, the fluorine-containing sulfonimide lithium salt includes or is lithium bis(fluorosulfonyl)imide, lithium (methylsulfonyl)(trifluoromethylsulfonyl)imide, or a combination thereof.

Relative to total molar amount of lithium salt in the electrolyte, the fluorine-containing sulfonimide lithium salt has an amount of 30 mol % or higher, optionally 40 mol % or higher, and further optionally from 50 mol % to 70 mol %. In the present application, very beneficial effects has been achieved by using the fluorine-containing sulfonimide lithium salt as primary lithium salt. Due to the structural characteristics, the fluorine-containing sulfonimide lithium salt has higher electrical conductivity at room temperature, and is more stable than conventional lithium salts (such as LiPF₆) and less sensitive to water and temperature. Therefore, the fluorine-containing sulfonimide lithium salt in the present application has higher chemical stability and electrochemical stability, and is useful for improving stability and power performance of an electrolyte.

Further optionally, the additive A in this application is at least one of a phosphate compound containing an unsaturated bond, a cyclic compound containing a —SO₂— bond and a silicon-oxygen compound containing an unsaturated branch chain, having a reduction potential in the electrolyte ranging from 1.2 V to 0.6 V.

In the field of lithium-ion batteries, the positive electrode current collector is usually aluminum metal foil. According to the amount of Al element relative to other elements in foils, the foils can be divided into pure aluminum foil and aluminum alloy foil. For pure aluminum foil, a certain amount of copper as an impurity element will be inevitably present; for aluminum alloy foil, by adding a variety of heterogeneous elements (such as copper, manganese, silicon, iron, etc.), the crystal phase and the diameter of the crystallization product in the aluminum alloy foil are effectively changed, so that the aluminum alloy foil has the technical advantages of higher mechanical strength and controllable resistivity, as compared with pure aluminum foil. Through in-depth research, the inventors found that: in the environment of an electrolyte with high concentration of fluorine-sulfonimide lithium salt, whether pure aluminum foil or aluminum alloy foil is used as the positive current collector, corrosion resistance of a substrate on its surface is closely related to the content of element copper per unit area of the substrate and affects the long-term cycle life and power performance of a lithium-ion battery. In the present application, by combining an electrolyte containing additive A with a content of element copper atom as an impurity per unit area of the aluminum foil within a specific range, the corrosion resistance of the aluminum foil can be further improved, resulting in the reduced corrosiveness of the electrolyte with high concentration of fluorine-containing sulfonimide lithium salt to the aluminum foil, meanwhile ensuring the mechanical strength of the aluminum foil and improving cycle performance of the battery. The inventors believe that use of the specific aluminum foil in the present application can avoid the problem of excessively high elongation of current collector during cold-pressing of electrode plate, and significantly reduce the occurrence of micro-breaks in the aluminum foil during cycling process of an battery. The inventors believe that by limiting the content of element copper atom as an impurity per unit area of the aluminum foil, the corrosion resistance of positive electrode current collector to electrolyte is improved; meanwhile, by using an electrolyte containing a specific additive A (optionally, having a reduction potential in the electrolyte of between 1.2 V and 0.6 V) not only can the additive be reduced and decomposed before corrosion potential of the fluorine-containing sulfonimide lithium salt (for example LFSI) is reached, thus forming a film on the surface of the positive electrode active material, but also a dense protective layer can be formed from the decomposition products of the additives on the surface of the aluminum foil which may not be covered by the positive electrode active material (for example, due to occasional coating peeling), thereby reducing the reactivity of impurity ions sites and improving the corrosion resistance of aluminum foil.

In some optional embodiments, the content of copper atoms as an impurity per unit area of aluminum foil is less than 0.021 $g/m^2$. Further optionally, the content of copper atoms as an impurity per unit area of aluminum foil is less than 0.018 $g/m^2$, or less than 0.015 $g/m^2$. In some optional embodiments, the content of copper atoms as an impurity per unit area of aluminum foil is not less than 0.008 $g/m^2$, further optionally not less than 0.009 $g/m^2$. In some exemplary embodiments, the content of copper atoms as an impurity per unit area of aluminum foil is 0.01 $g/m^2$, 0.013 $g/m^2$, 0.016 $g/m^2$ or 0.020 $g/m^2$. The inventors found that by using the content of copper atoms as an impurity per unit area of aluminum foil within a certain range (for example, from 0.013 $g/m^2$ to 0.021 $g/m^2$), gas production performance after high-temperature storage and cycle performance of the battery are not significantly affected. However, as the content of copper atoms is further reduced, the mechanical properties of aluminum foil will be affected, and gas production performance after high-temperature storage and cycle performance will be deteriorated to a certain extent. When the content of copper atoms is too high, corrosion resistance of the aluminum foil will be deteriorated. Thus, by controlling the content of copper atoms as an impurity per unit area of aluminum foil, an excellent balance between high-temperature gas production performance and cycle performance of the battery can be achieved.

In some optional embodiments, the aluminum foil (including pure aluminum foil and aluminum alloy foil) has a thickness in the range of from 6 μm to 16 μm, optionally from 8 μm to 15 μm.

In the present application, the phosphate compound containing an unsaturated bond may include at least one of compounds of Formula 2,

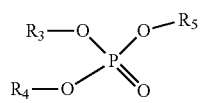

Formula 2 in Formula 2, $R_3$, $R_4$ and $R_5$ are each independently one selected from alkenyl, alkynyl, haloalkyl, haloalkenyl, haloalkynyl, and alkyl having 1 to 6 carbon atoms, and aryl and haloaryl having 6 to 10 carbon atoms, and at least one of $R_3$, $R_4$ and $R_5$ contains an unsaturated bond.

In some embodiments, in Formula 2, $R_3$, $R_4$ and $R_5$ may be each independently methyl, ethyl, propyl, isopropyl, butyl, vinyl, allyl, 3-butenyl, isobutenyl, 4-pentenyl, ethynyl, propargyl, 3-butynyl, 1-methyl-2-propynyl or halogenated derivatives thereof, and at least one of $R_3$, $R_4$ and $R_5$ contains a double bond or a triple bond. In the context of describing $R_3$, $R_4$ and $R_5$ in Formula 2, the halogenated derivatives include, but not limited to, monofluoromethyl, difluoromethyl, trifluoromethyl, 2,2,2-trifluoroethyl, 2,2-difluoroethyl, 2,2,2-trifluoroethyl, 3,3-difluoropropyl, 3,3,3-trifluoropropyl and hexafluoroisopropyl, etc.

Optionally, $R_3$, $R_4$ and $R_5$ have at least one branch chain having an end of a carbon-carbon unsaturated bond. Further optionally, all of branch chains in $R_3$, $R_4$ and $R_5$ have an end of a carbon-carbon unsaturated bond.

In some embodiments, the compound of Formula 2 is one or more of triallyl phosphate, tripropargyl phosphate, dipropargyl methyl phosphate, dipropargyl ethyl phosphate, dipropargyl propyl phosphate, dipropargyl trifluoromethyl phosphate, dipropargyl 2,2,2-trifluoroethyl phosphate, dipropargyl 3,3,3-trifluoropropyl phosphate, dipropargyl hexafluoroisopropyl phosphate, triallyl phosphate, diallyl methyl phosphate, diallyl ethyl phosphate, diallyl propyl phosphate, diallyl trifluoromethyl phosphate, diallyl 2,2,2-trifluoroethyl phosphate, diallyl 3,3,3-trifluoropropyl phosphate or diallyl hexafluoroisopropyl phosphate.

Further optionally, at least one of $R_3$, $R_4$ and $R_5$ is an allyl group.

For example, all of $R_3$, $R_4$ and $R_5$ are optionally fluorinated allyl groups. That is, the compound of Formula 2 is triallyl phosphate (TAP) and its fluorinated derivatives.

In this application, the cyclic compound containing a —$SO_2$— bond may be at least one of compounds of Formula 3 to Formula 5,

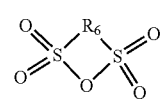

Formula 3

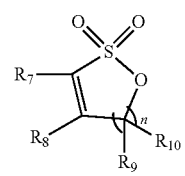

Formula 4

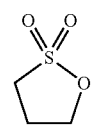

Formula 5 in Formula 3, $R_6$ is one elected from alkylene, alkenylene, alkynylene, halogenated alkylene, halogenated alkenylene, halogenated alkynylene having 2 to 4 carbon atoms, and arylene and halogenated arylene having 6 to 10 carbon atoms, in Formula 4, $R_7$, $R_8$, $R_9$ and $R_{10}$ are each independently one selected from H, alkyl, alkenyl, alkynyl, haloalkyl, haloalkenyl, and haloalkynyl having 1 to 6 carbon atoms; and aryl and halogenated aryl having 6 to 10 carbon atoms; n is 1, 2 or 3.

In some optional embodiments, the compound of Formula 3 may be one or more of the following compounds:

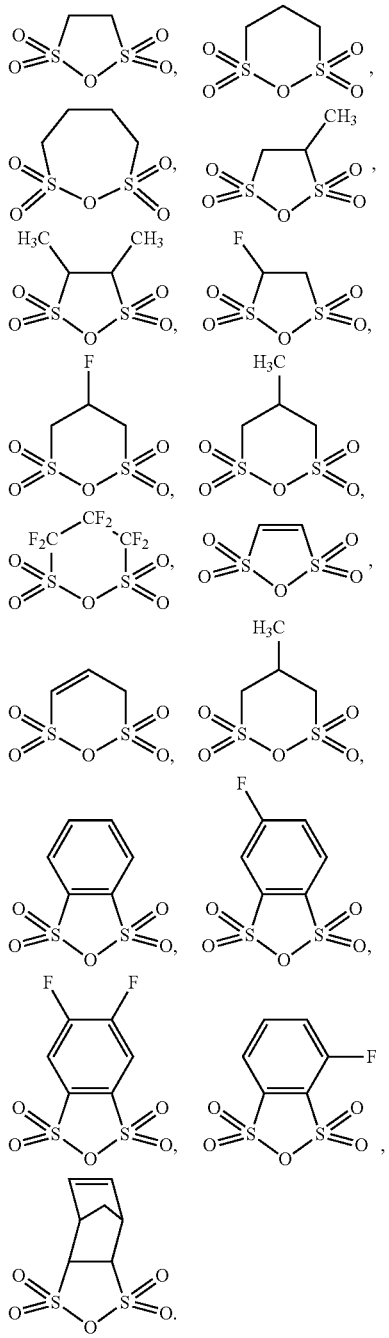

In some optional embodiments, in Formula 4, $R_7$, $R_8$, $R_9$ and $R_{10}$ are each independently H, methyl, ethyl, propyl, isopropyl, butyl, vinyl, allyl, 3-butenyl, isobutenyl, 4-pentenyl, ethynyl, propargyl, 3-butynyl, 1-methyl-2-propynyl or halogenated derivatives thereof. In the context of describing $R_7$, $R_8$, $R_9$ and $R_{10}$ in Formula 4, the halogenated derivatives include, but not limited to, monofluoromethyl, difluoromethyl, trifluoromethyl, 2,2,2-trifluoroethyl, 2,2-difluoroethyl, 2,2,2-trifluoroethyl, 3,3-difluoropropyl, 3,3,3-trifluoropropyl and hexafluoroisopropyl, etc. Further optionally, the compound of Formula 4 is one or more of 1,3-propene sultone (PST), 1,4-butene sultone, 1-methyl-1,3-propene sultone, and halogenated derivatives thereof.

In some optional embodiments, the cyclic compound containing a —$SO_2$— bond includes the compound of Formula 5. The compound of Formula 5 may be 1,3-propane sultone (PS).

In this application, the siloxane compound containing an unsaturated branch chain may be a compound of Formula 6,

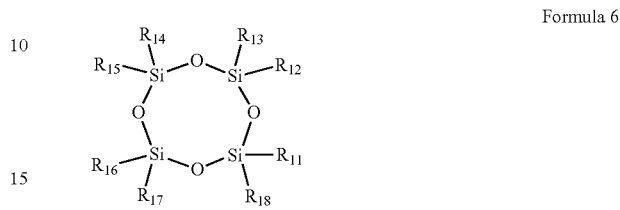

Formula 6 wherein $R_{11}$, $R_{12}$, $R_{13}$, $R_{14}$, $R_{15}$, $R_{16}$, $R_{17}$, and $R_{18}$ are each independently selected from hydrocarbon groups having 1 to 4 carbon atoms that are unsubstituted or substituted by a halogen element; and at least one of $R_{11}$, $R_{12}$, $R_{13}$, $R_{14}$, $R_{15}$, $R_{16}$, $R_{17}$, and $R_{18}$ contains an unsaturated bond. Optionally, the aforementioned unsaturated bond is a carbon-carbon double bond or a carbon-carbon triple bond.

In the present application, the siloxane compound containing an unsaturated branch chain represented by Formula 6 may be selected from one or more of the following compounds:

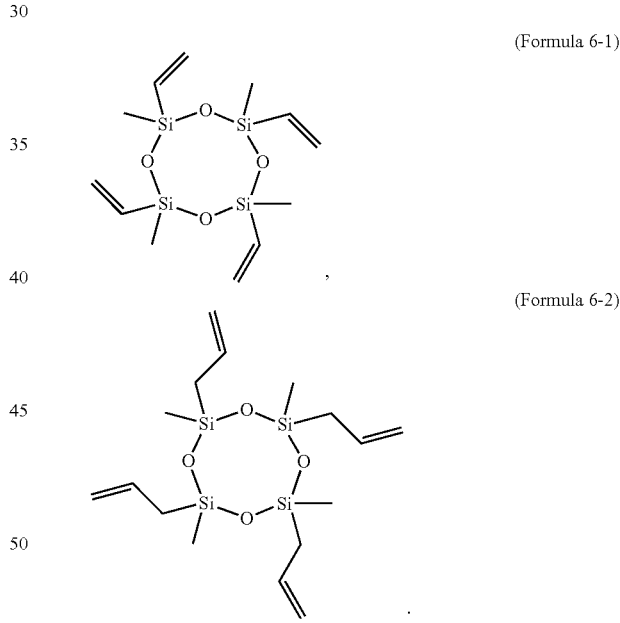

The inventors found that the compounds represented by Formulas 2 to 6 in the electrolyte contain at least one of phosphorus-oxygen bond, sulfur-oxygen bond, and silicon-oxygen bond, and at the same time further contain an unsaturated bond in a branch chain. These compound can form the SEI film having relatively high density and relatively good toughness on the surface of positive electrode active material layer, which can effectively inhibit the oxidation and decomposition of electrolyte. Meanwhile, the compounds of Formula 2 to Formula 6 have the reduction potential in the electrolyte of between 1.2 V and 0.6 V, thus can undergo reduction and decomposition before reaching corrosion potential of the fluorine-containing sulfonimide lithium salt (for example LFSI) and the reaction products can adhere to the exposed area of current collector that is not covered by the positive electrode active material, thereby inhibiting the corrosion of the current collector by the electrolyte (especially high concentration of salt).

In some optional embodiments, relative to total weight of the electrolyte, mass percentage of the additive A is from 0.01 wt % to 5 wt %. Further optionally, the mass percentage of the additive A in the electrolyte is from 0.1 wt % to 3.5 wt %. Further optionally, the mass percentage of the additive A in the electrolyte is from 0.12 wt % to 2.8 wt %. The inventors found that by using the additive A having a relative content in the electrolyte within the above range, not only can an interface film with stable structure and relatively high toughness be formed on the surface of the positive electrode plate, thereby effectively inhibiting side reactions of the electrolyte on the surface of the positive electrode plate, but also corrosion of aluminum foil caused by high-concentration salt can be effectively inhibited, without significantly increasing interface impedance of a battery core, and without affecting the power performance of a battery core.

In some optional embodiments, the electrolyte may further include a second lithium salt. The second lithium salt may be selected from at least one of inorganic lithium salt and organic lithium salt. The second lithium salt may be selected from one or more of $LiPF_6$, $LiBF_4$, $LiSbF_6$, $LiAsF_6$, $LiClO_4$, $LiN(C_2F_5SO_2)_2$, $LiN(CF_3SO_2)_2$, $CF_3SO_3Li$, $LiC(CF_3SO_2)_3$ and $LiB(C_2O_4)_2$. Further optionally, the second lithium salt includes at least one of $LiPF_6$ and $LiBF_4$. Especially optionally, the second lithium salt is or contains lithium hexafluorophosphate.

In some optional embodiments, molar ratio of the first lithium salt to the second lithium salt is in the range of from 1:1 to 20:1, and further optionally in the range of from 1.2:1 to 10:1, especially optionally in the range of from 6:4 to 9:1. For example, the molar ratio of the first lithium salt to the second lithium salt may be 2:1, 3:1, 4:1, 5:1, 6:1, 7:1, 7:3, or 8:1.

Through in-depth research, the inventors found that when the inorganic fluorine-containing lithium salt is used as the second lithium salt, part of the lithium salt decomposes during the first charging, to produce fluoride ions which may react with aluminum foil to form an aluminum fluoride passivation layer, thereby inhibiting corrosion of the aluminum foil. Through in-depth research, the inventors found that when the amount of inorganic fluorine-containing lithium salt in total lithium salt is greater than 10 mol %, the corrosion of aluminum foil can be effectively inhibited. However, in case that the inorganic fluorine-containing lithium salt is used as the primary lithium salt or present in an excessively large amount, film forming effect on the cathode is not good, thereby deteriorating high-temperature storage and gas production. Therefore, by using the fluorine-containing sulfonimide lithium salt as the first lithium salt and the inorganic fluorine-containing lithium salt as the second lithium salt, the issues of the conductivity of the electrolyte and the corrosion resistance of the aluminum foil both can be addressed.

Optionally, total concentration of lithium salt in the electrolyte may be from 0.5 mol/L to 2.0 mol/L, and further optionally may be from 0.6 mol/L to 1.8 mol/L, from 0.7 mol/L to 1.7 mol/L or from 0.8 mol/L to 1.5 mol/L. Specifically, the total concentration of lithium salt in the electrolyte may be about 0.5 mol/L, 0.6 mol/L, 0.7 mol/L, 0.8 mol/L, 0.9 mol/L, 1.0 mol/L, 1.1 mol/L, 1.2 mol/L, 1.3 mol/L, 1.4 mol/L, 1.5 mol/L, 1.6 mol/L, 1.7 mol/L, 1.8 mol/L, 1.9 mol/L or 2.0 mol/L.

Furthermore, the conductivity of the electrolyte is in the range of from 6 $mS·cm^{-1}$ to 12 $mS·cm^{-1}$, optionally in a range of from 7.8 $mS·cm^{-1}$ to 11.5 $mS·cm^{-1}$, further optionally in a range of from 8 $mS·cm^{-1}$ to 11 $mS·cm^{-1}$. Especially optionally, the conductivity of the electrolyte is in the range of from 8 $mS·cm^{-1}$ to 9.5 $mS·cm^{-1}$. In some exemplary embodiments, the conductivity of the electrolyte is 8 $mS·cm^{-1}$, 8.5 $mS·cm^{-1}$, 9.0 $mS·cm^{-1}$ or 9.5 $mS·cm^{-1}$.

In this application, the electrolyte may have an infiltration coefficient on the surface of the positive electrolyte plate ranging from 0.9 μg/s to 3.0 μg/s, and optionally from 1.0 μg/s to 2.8 μg/s. The inventors found that by controlling the infiltration coefficient of the electrolyte on the surface of the positive electrolyte plate, the corrosion of aluminum foil by the electrolyte can be further reduced. Due to high infiltration coefficient of the electrolyte on the surface of the positive electrode plate, the decomposition products of additive A can quickly enter the positive electrode active material layer and reach the positive electrode current collector, and form a dense protective layer on the area of the aluminum foil surface that is not covered by the positive electrode active material particles, thereby inhibiting the corrosion of aluminum foil caused by high-concentration fluorine-containing sulfonimide lithium salt to a certain extent and reducing the DCR of the lithium-ion battery and extending the cycle life of the lithium-ion battery.

In this application, the infiltration coefficient of the electrolyte on the surface of the positive electrode plate can be determined by the following method: filling a dropper with a certain inner diameter and a standard scale with the electrolyte; drying the positive electrode plate sufficiently (for example, drying at a temperature from 70° C. to 90° C. for 10 h to 15 h), followed by cutting out a square positive electrode plate with sufficient area; in a drying room with the humidity of lower than 2%, making the dropper's lower mouth contact with the square positive electrode plate, while ensuring that the dropper is perpendicular to the surface of the square positive electrode plate, so that the electrolyte in the dropper gradually infiltrates into the inside of the square positive electrode plate. The mass of the electrolyte infiltrated into the square positive electrode plate per second is recorded, which is the infiltration coefficient of the electrolyte on the surface of the positive electrode plate.

The infiltration coefficient of the electrolyte on the surface of the positive electrode plate can be achieved by adjusting the parameters such as the porosity and the BET of positive electrode plate, the viscosity and the surface tension of electrolyte, and adjusting the physical parameters of the electrolyte according to the microstructure of the positive electrode plate. On the basis of the present disclosure, a person of ordinary skill in the art can reasonably determine how to adjust the parameters to obtain a suitable infiltration coefficient. For example, generally speaking, under the same other conditions, the higher the viscosity, the lower the infiltration coefficient; and vice versa.

In some optional embodiments, the electrolyte has a viscosity at 25±3° C. of less than or equal to 5 mPa·s. Further optionally, the electrolyte has a viscosity at 25±3° C. of less than or equal to 4.5 mPa·s, 3 mPa·s or 3.5 mPa·s. For example, the electrolyte has a viscosity at 25±3° C. of between 2.0 mPa·s and 5.0 mPa·s. The viscosity of the electrolyte can be measured by a method known in the art.

The inventors found that when the viscosity at room temperature of the electrolyte does not exceed 5 mPa·s, it is beneficial to infiltration of the electrolyte into the positive electrode plate in a short time. Since the reduction decomposition products of the additive A dissolve in the electrolyte and then infiltrate the voids of the cathode active material along with the electrolyte, the infiltrability of the electrolyte and especially the viscosity of the electrolyte will affect the movement speed of the decomposition products. The better the electrolyte wettability (the lower the viscosity) is, the more favorable it is for the decomposition products to reach the exposed area of the current collector and protect the current collector.

The surface tension of the electrolyte can be achieved by using an appropriate organic solvent. In some embodiments, the organic solvent in the electrolyte may be used without limitation. Generally, organic solvents commonly used in this field nay be used. Some examples of organic solvents that can be used include, but not limited to: dimethyl carbonate (DMC), diethyl carbonate (DEC), dipropyl carbonate (DPC), ethyl methyl carbonate (EMC), methyl propyl carbonate (MPC), ethylene propyl carbonate (EPC), vinyl ethylene carbonate (VEC), ethylene carbonate (EC), propylene carbonate (PC), gamma-butyrolactone (GBL), butylene carbonate (BC), fluoroethylene carbonate (FEC), methyl formate (MF), ethyl formate, methyl acetate (MA), ethyl acetate (EA), propyl acetate (PA), methyl propionate (MP), ethyl propionate (EP), propyl propionate (PP), methyl butyrate (MB), ethyl butyrate (EB), sulfolane (SF), dimethyl sulfone (MSM), methyl ethyl sulfone (EMS)), diethyl sulfone (ESE), tetrahydrofuran (THF) and propylene sulfite. From the perspective of practicality and commercialization, optionally, the non-aqueous organic solvent is carbonate, or a mixture of carbonate and carboxylic acid ester. In some optional embodiments, mass percentage of the organic solvent in the electrolyte is from 65% to 85%.

The above-mentioned electrolyte can be prepared according to conventional methods in the art. The organic solvent and the electrolyte lithium salt and optional additives can be mixed uniformly to obtain an electrolyte. The order for adding materials is not particularly limited. In an example, the electrolytic lithium salt and optional additives are added to organic solvent and mixed uniformly to obtain the electrolyte. In this example, the electrolytic lithium salt may be added to the organic solvent first, followed by adding optional additives to the organic solvent separately or at the same time.

In some embodiments of the present application, the positive electrode active material includes at least one of the compounds represented by Formula 7 to Formula 9:

Formula 7

Formula 8

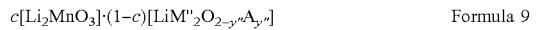

Formula 9 wherein each A is independently one or more of S, N, F, Cl, Br and I;

in Formula 7, $-0.1 \leq x \leq 0.2$, $0.5 \leq a < 1$, $0.02 < b < 0.3$, $0.55 < a+b < 1$, $0 \leq y < 0.2$, M includes one or more of Mn, Fe, Cr, Ti, Zn, V, Al, Zr and Ce;

in Formula 8, $-0.1 \leq x' \leq 0.2$, $0.4 \leq a' < 0.6$, $0 \leq y' < 0.2$, M' includes one or more of Mn, Fe, Cr, Ti, Zn, V, Al, Zr, Mg, and Ce; and in Formula 9, $0 < c < 1$, $0 \leq y'' < 0.2$, M'' is one or more of Ni, Co, Mn, Fe, Cr, Ti, Zn, V, Al, Zr and Ce.

In some optional embodiments of the present application, the positive electrode active material may be selected from at least one of $LiNi_{0.5}Co_{0.2}Mn_{0.3}O_2$ (NCM523), $LiNi_{0.55}Co_{0.05}Mn_{0.4}O_2$, $LiNi_{0.55}Co_{0.1}Mn_{0.35}O_2$, $LiNi_{0.55}Co_{0.12}Mn_{0.33}O_2$, $LiNi_{0.55}Co_{0.15}Mn_{0.3}O_2$, $LiNi_{0.6}Co_{0.15}Mn_{0.25}O_2$, $LiNi_{0.6}Co_{0.18}Mn_{0.22}O_2$, $LiNi_{0.6}Co_{0.2}Mn_{0.2}O_2$ (NCM622), $LiNi_{0.65}Co_{0.05}Mn_{0.3}O_2$, $LiNi_{0.65}Co_{0.09}Mn_{0.26}O_2$, $LiNi_{0.65}Co_{0.12}Mn_{0.23}O_2$, $LiNi_{0.65}Co_{0.15}Mn_{0.2}O_2$, $LiNi_{0.8}Co_{0.1}Mn_{0.1}O_2$ (NCM811), $LiNi_{0.85}Co_{0.15}Al_{0.05}O_2$, $LiNi_{0.5}Mn_{1.5}O_4$, $0.2[Li_2MnO_3] \cdot 0.8[LiNi_{0.5}Co_{0.2}Mn_{0.3}O_2]$, $LiNi_{0.88}Co_{0.15}Mn_{0.07}O_2$ and $0.3[Li_2MnO_3] \cdot 0.7[LiNi_{0.8}Co_{0.01}Mn_{0.1}O_2]$.

The inventors found that compared with the above high-nickel cathode electrode materials and the low working voltage (the charging cut-off voltage V of battery core<4.2 V), low-nickel cathode material has more stable structure, has less delithiation during charing process in a low-voltage system, fewer surface side reactions during the charging and discharging process, and lower energy density, and cannot effectively achieve the excellent effects when combined with other optional features herein, but increase costs.

Generally, in addition to the positive electrode active material, the positive electrode plate also contains a conductive agent and a binder. If necessary, solvents and other additives, such as N-methylpyrrolidone (NMP) and PTC thermistor materials, may also be mixed into the active material of the positive electrode plate.

The conductive agent is not particularly limited as long as it exhibits conductivity and does not cause chemical changes in the battery. Suitable examples of conductive agent include, but are not limited to, graphite, such as natural graphite or artificial graphite; graphene; carbon black materials, such as carbon black, Super P, acetylene black, Ketjen black, etc.; conductive fibers, such as carbon fiber, metal fiber or carbon nanotube conductive fibers; metal powder, such as aluminum or nickel powder; conductive whiskers, such as zinc oxide, potassium titanate, etc.; conductive metal oxides, such as iron oxides; polyphenylene derivatives, etc.; and any combination thereof. In the positive electrode plate active material layer of the battery, weight of the conductive agent may be from 0% to 4%, optionally from 1% to 3% of total weight of the positive electrode plate active material layer.

The binder is not particularly limited, as long as it provides a bonding function and does not cause chemical changes in the battery. The binder may be one or more selected from polyvinylidene fluoride-hexafluoropropylene copolymer (PVDF-co-HFP), polyvinylidene fluoride, polyacrylonitrile, polymethyl methacrylate, polyvinyl alcohol, carboxymethyl cellulose (CMC), starch, hydroxypropyl fiber, regenerated cellulose, polyvinylpyrrolidone, polytetrafluoroethylene, polyethylene, polypropylene, polyacrylic acid, styrene butadiene rubber (SBR), fluorine rubber, ethylene-vinyl acetate copolymer materials, polyurethanes and their copolymers. In the positive electrode plate active material layer of the battery, weight of the binder may be from 0% to 4%, optionally 1% to 3% of the total weight of the positive electrode plate active material layer.

In some optional embodiments, the porosity of the positive electrode plate is from 13% to 40%, for example from 15% to 37%. In some exemplary embodiments, the positive electrode plate may have a porosity of for example, 18%, 20%, 24%, 26%, 38%, 30%, or 34%.

In some optional embodiments, the specific surface area of the positive electrode plate is from $0.5 \text{ m}^2/\text{g}$ to $1.5 \text{ m}^2/\text{g}$. The larger the specific surface area of the positive electrode plate, the easier it is to absorb the electrolyte, which can also speed up the infiltration of the electrolyte on the positive electrode plate. By adjusting the specific surface area of the positive electrode plate to the range of from $0.5 \text{ m}^2/\text{g}$ to $1.5 \text{ m}^2/\text{g}$, the electrolyte can quickly infiltrate the positive electrode plate, and the contact area between the positive electrode active material layer and the electrolyte can be controlled within a reasonable range, effectively preventing side reactions between the electrolyte and the positive electrode plate.

In this application, type, thickness, and composition of the separator are not particularly limited, and can be selected according to actual needs. Specifically, the separator may be selected from polyethylene film, polypropylene film, polyvinylidene fluoride film and a multilayer composite film thereof. The separator can be a single-layer film or a multilayer composite film. When the separator is a multilayer composite film, the materials of each layer may be the same or different.

In the battery of the present application, the negative electrode active material may be selected from soft carbon, hard carbon, (artificial or natural) graphite, silicon, silicon-oxygen compound, silicon-carbon composite, lithium titanate, metal capable of forming an alloy with lithium, and the like. Specifically, carbon-based materials, silicon-based materials, tin-based materials, and the like may be used. Optionally, graphite is used as the negative electrode active material. However, this application is not limited to these materials, and other well-known conventional materials that can be used as negative electrode active materials for lithium-ion batteries may also be used. These negative electrode active materials may be used alone or in combination of two or more.

The battery of the present application can be prepared according to conventional methods in the art. For example, a negative electrode plate is obtained by dispersing the negative electrode active material, optional conductive agent and binder in a solvent (such as water) to form a uniform negative electrode slurry; coating the negative electrode slurry on the negative electrode current collector, followed by drying and cold-pressing. For example, a positive electrode plate is obtained by dispersing the positive electrode active material, optional conductive agent and binder in a solvent (such as N-methylpyrrolidone, also referred to as NMP) to form a uniform positive electrode slurry; coating the positive electrode slurry on the positive electrode current collector, followed by drying and cold-pressing. The positive electrode plate, a separator, and the negative electrode plate are wound (or laminated) in order, so that the separator is located between the positive electrode plate and the negative electrode plate for isolation, thereby obtaining an electrode assembly. The electrode assembly is placed in an outer packaging, and an electrolyte is injected, to obtain a secondary battery.

There is no particular limitation on the shape of the lithium-ion battery in this application, which may be cylindrical, square, or any other shape. FIG. 1 shows a lithium-ion battery 5 with a square structure as an example.

In some embodiments, the lithium-ion battery may include an outer packaging. The outer packaging is used to encapsulate the positive electrode plate, the negative electrode plate and the electrolyte.

Figure 2:
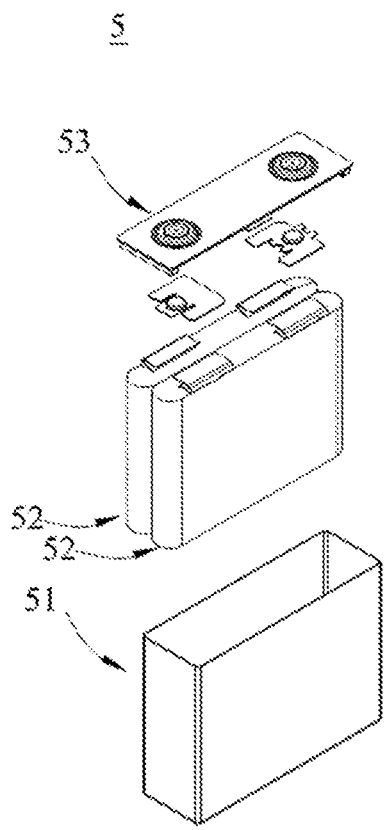
FIG. 2 is an exploded view of FIG. 1.

In some embodiments, referring to FIG. 2, the outer packaging may include a housing 51 and a cover plate 53. In an example, the housing 51 may include a bottom plate and a side plate connected to the bottom plate, and the bottom plate and the side plate are combined to form an accommodating cavity. The housing 51 has an opening communicating with the accommodating cavity, and the cover plate 53 can cover the opening to close the accommodating cavity.

The positive electrode plate, the negative electrode plate and the separator may be wound or laminated to form an electrode assembly 52. The electrode assembly 52 is packaged in the accommodating cavity. The electrolyte may be an electrolytic solution, and the electrolytic solution is infiltrated in the electrode assembly 52. The number of electrode assemblies 52 included in the secondary battery 5 may be one or several, which can be adjusted according to requirements.

In some embodiments, the outer packaging of the secondary battery may be a hard housing, such as a hard plastic housing, aluminum housing, steel housing, or the like. The outer packaging of the secondary battery may also be a soft pack, such as a pouch type soft pack. The material of the soft pack may be plastic, for example, including one or more of polypropylene (PP), polybutylene terephthalate (PBT), polybutylene succinate (PBS), and the like.

In some embodiments, the secondary battery may be assembled into a battery module. The battery module may contain one or more secondary batteries, depending on the requirements of the application and capacity of the battery module.

Figure 3:
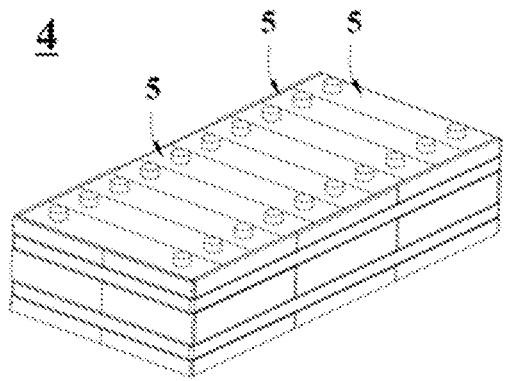
FIG. 3 is a schematic diagram of an embodiment of a battery module.

FIG. 3 is a battery module 4 as an example. Referring to FIG. 3, in the battery module 4, a plurality of secondary batteries 5 may be arranged in order along the length direction of the battery module 4. Apparently, it can also be arranged in any other manner. Furthermore, the plurality of secondary batteries 5 may be fixed by fasteners.

Optionally, the battery module 4 may further include a housing having an accommodating space in which a plurality of secondary batteries 5 are accommodated.

In some embodiments, the above battery module may also be assembled into a battery pack. The battery pack may contain one or more battery modules, depending on the requirements of the application and capacity of the battery pack.

Figure 4:
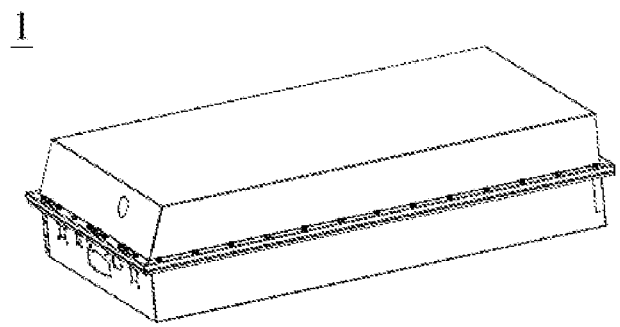
FIG. 4 is a schematic diagram of an embodiment of a battery pack.
Figure 5:
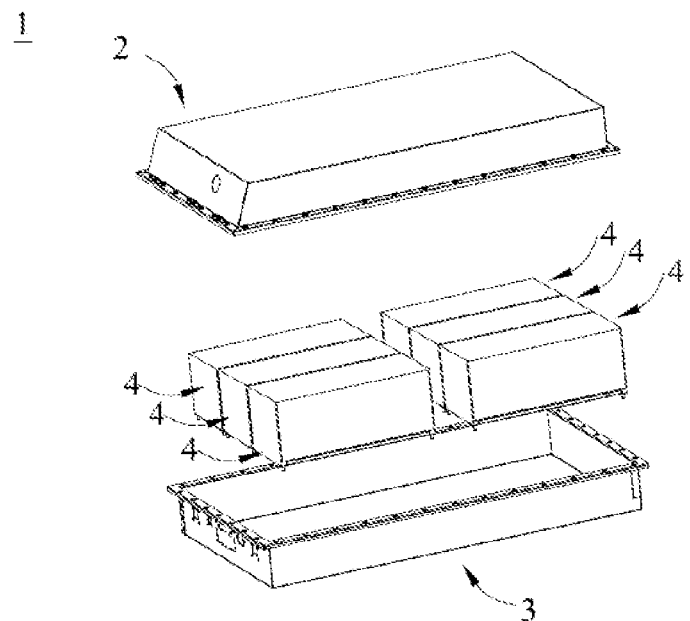
FIG. 5 is an exploded view of FIG. 4.

FIGS. 4 and 5 show the battery pack 1 as an example. Referring to FIGS. 4 and 5, the battery pack 1 may include a battery case and a plurality of battery modules 4 provided in the battery case. The battery case includes an upper case body 2 and a lower case body 3. The upper case body 2 may cover the lower case body 3 to form a closed space for accommodating the battery module 4. A plurality of battery modules 4 can be arranged in the battery case in any manner.

The present application also provides a device, comprising the lithium-ion battery described in the present application (also referred to as "secondary battery" herein). The secondary battery may be used as a power source of the device, and may also be used as an energy storage unit of the device. The device can be, but not limited to, mobile devices (such as mobile phones, notebook computers, etc.), electric vehicles (such as pure electric vehicles, hybrid electric vehicles, plug-in hybrid electric vehicles, electric bicycles, electric scooters, electric golf vehicles, electric trucks, etc.), electric trains, ships and satellites, energy storage systems, etc.

In a device, a secondary battery, a battery module, or a battery pack may be selected according to usage requirements of the device.

Figure 6:
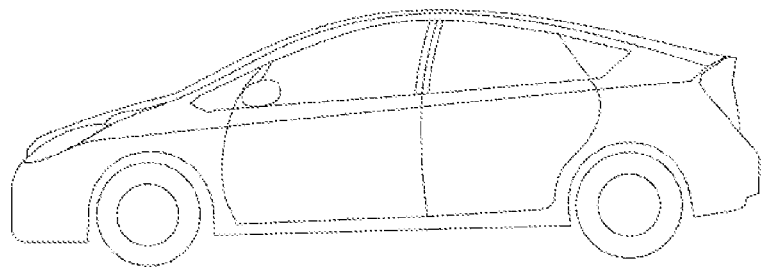
FIG. 6 is a schematic diagram of an embodiment of a device using a secondary battery as a power source.

FIG. 6 is a device as an example. The device is a pure electric vehicle, a hybrid electric vehicle, or a plug-in hybrid electric vehicle, etc. In order to meet the requirements of the device for high power and high energy density of the secondary battery, a battery pack or a battery module may be used.

As another example, the device may be a mobile phone, a tablet computer, a notebook computer, and the like. Such device is generally required to be thin and light, and a secondary battery may be used as a power source.

The following examples further illustrate the beneficial effects of the present application.

EXAMPLES

In the following examples and comparative examples, unless otherwise specified, the reagents, materials and instruments used are commercially available or synthetically available.

1. Preparation Process (1) Preparation of Electrolytic Solution

In a glove box filled with argon gas (water content<10 ppm, oxygen content<1 ppm), a first lithium salt and a second lithium salt in accordance with a certain molar ratio (the sum of the concentration of lithium salt is 1 M) were added to non-aqueous organic solvent. After the lithium salt was completely dissolved, an appropriate amount of other additives were added. After stirring uniformly, an electrolytic solution with a lithium salt concentration of about 1.0 mol/L was obtained.

In Examples (Ex) 1-21 and Comparative Examples (CE) 1-4, lithium salts, additives, organic solvents used and the amounts of various substances were shown in the table 1, including the concentration of the lithium salt calculated on the basis of total volume of the electrolyte, and the content of the additives as a mass percentage calculated on the basis of total mass of the electrolyte.

(2) Preparation of Positive Electrode Plate:

In Examples 1-22 and Comparative Examples 1-5, 10 μm thick aluminum foils with different amounts of element copper, including pure aluminum foil, were used as the positive electrode current collectors, with the contents of element copper atom as an impurity per unit area in each positive current collector as shown in Table 2.

The positive electrode active material $LiNi_{0.8}Co_{0.1}Mn_{0.1}O_2$, the conductive agent Super P, the binder polyvinylidene fluoride (PVDF) were made into a positive electrode slurry in N-Methylpyrrolidone (NMP). The solid content in the positive electrode slurry was 50 wt %, and the mass ratio of $LiNi_{0.8}Co_{0.1}Mn_{0.1}O_2$, Super P, and PVDF in solid was 8:1:1. The positive electrode slurry was coated on the current collector aluminum foils and dried at 85° C. followed by cold-pressing, trimming, slicing and slitting, and then further dried under vacuum at 85° C. for 4 h, thereby obtaining a positive electrode plate. By adjusting the parameters including coating weight, the pressure during cold-pressing, the porosity of the electrode plate was changed, using AccuPyc II 1340 true density analyzer to test the porosity of the positive electrode plate according to the instrument manual. The porosity values of the positive electrode plate in Examples 1-22 and Comparative Examples 1-5 were shown in Table 2.

(3) Preparation of Negative Electrode Plate:

Graphite used as the negative electrode active material, the conductive agent Super P, the thickener CMC, and the binder styrene butadiene rubber (SBR) were mixed uniformly in deionized water to form a negative electrode slurry. The solid content in the negative electrode slurry was 30 wt %, and the mass ratio of graphite, Super P, CMC and binder styrene butadiene rubber (SBR) in solid was 80:15:3:2. The negative electrode slurry was coated on the current collector copper foil and dried at 85° C. followed by cold-pressing, trimming, slicing and slitting, and then further dried under vacuum at 120° C. for 12 h, thereby obtaining a negative electrode plate.

(4) Preparation of Separator

Polyethylene film (PE) with 16-micron thickness was used as the separator.

(5) Preparation of Lithium-Ion Battery:

The prepared positive electrode plate, separator, and negative electrode plate were stacked in order, so that the separator was disposed between the positive and negative electrode plates for isolating the positive and negative electrodes, and after winding, a bare core was obtained. After welding the tabs, the bare core was placed in an outer packaging followed by injecting the electrolyte prepared above into the dry core, followed by packing, standing, forming, shaping, and testing the capacity, thereby completing the preparation of the lithium-ion battery. The soft-pack lithium-ion battery had a thickness of 4.0 mm, a width of 60 mm, and a length of 140 mm.

2. Performance Test (1) Test for high temperature gas production performance of lithium-ion battery At room temperature (25° C.), the lithium-ion battery was charged to 4.3V at a constant current of 1C, and then charged to a current of 0.05C at a constant voltage of 4.3V. After the battery was fully charged, the water exclusion method was used to test the initial volume of the battery. Then the battery was stored in an oven at 80° C. for 10 days and then taken out. The battery was allowed to stand at room temperature for 60 minutes. The volume of the battery was measured by the water exclusion method within 60 minutes after the battery was cooled to room temperature.

Following above storage steps, the storage test were carried out until storage for 30 days. On the basis of the battery volume tested before storage, the volume expansion rate of the battery with different storage periods was calculated. The volume expansion rate (%) of lithium-ion battery after storage for different days at 80° C.=(the battery volume measured after storage for N days/the battery volume measured before storage)−1.

(2) Test for Low-Temperature Power Performance of Lithium-Ion Battery

At room temperature, the lithium-ion battery was charged to 4.3V at a constant current of 1C, and then charged to a current of 0.05C at constant voltage of 4.3V. After the battery was fully charged, the battery was allowed to stand for 5 min, and discharged at 1C for 30 min (the charge of the battery core is 50% SOC), and then was allowed to stand for 5 min. The temperature was adjusted to −20° C., and the battery was allowed to stand for 1 h and the voltage V1 of the battery core was recorded at this moment. The battery was discharged at 0.4C for 15 s, and the voltage V2 after pulse discharge was recorded. DCR after discharge for 15 s from 50% SOC of the battery core=(V1−V2)/I in which I=0.4C.

(3) Viscosity Test

First, 30 mL of electrolyte was taken and heated for 30 min in a constant temperature water bath at 25° C. Then the electrolyte was added into the liquid-adding cup of the viscometer meanwhile connecting to a constant temperature water bath to make the temperature of the liquid-adding cup constant. The rotor and rotation speed in the viscometer was configured. After 10 minutes, the value on the instrument panel of the viscometer was recorded, that is, the viscosity of the electrolyte at this temperature.

(4) Infiltration Coefficient Test

A capillary tube (dropper) with an inner diameter d and a standard scale was filled with to an electrolyte. The height of the electrolyte in the capillary tube was recorded as h; the positive electrode plate was fully dried (for example, dried at a temperature from 70° C. to 90° C. for 10 h to 15 h), followed by cutting out a square positive electrode plate of 5 cm×5 cm; in a dry room with a humidity of lower than 2%, the dropper's lower mouth contacted with the square positive electrode plate, while ensuring that the dropper was perpendicular to the surface of the square positive electrode plate, so that the electrolyte in the dropper gradually infiltrated into the inside of the square positive electrode plate. The time t when the electrolyte was completely absorbed, and the infiltration coefficient v, expressed in unit of μg/s, of the electrolyte on the surface of the positive electrode plate was calculated according to the following equation:

$$v = \pi i \cdot (d/2)^2 \cdot h \cdot \rho / t$$

v: electrolyte absorption rate (μg/s), d: capillary diameter (cm), h: height of electrolyte (cm), ρ: density of electrolyte (g/cm$^3$), t: electrolyte absorption time (s).

(5) Test for Cycle Performance

At 25° C., the lithium-ion battery was first fully discharged at 1C and then tested. The test process was performed by: charging the lithium-ion battery at a constant current of 1C to a voltage of 4.3 V, then charging at a constant voltage of 4.3 V to a current of 0.05C, and after standing for 5 minutes, discharge the lithium-ion battery at a constant current of 1C to a voltage of 3.0 V. This was regarded as a charge/discharge cycle process, and the obtained discharge capacity at this time was the discharge capacity at the first cycle. The lithium-ion battery was subjected to multiple cycle charge and discharge tests according to the above method until the discharge capacity of the lithium-ion secondary battery decayed to 80%, and the number of cycles of the lithium-ion battery was recorded.

TABLE 1

Composition of electrolyte

| Nos. | The first lithium salt Substance | Content M | The second lithium salt Substance | Content M | Additive A Substance | Reduction potential V |
|---|---|---|---|---|---|---|
| Ex 1 | Lithium bis(fluorosulfonyl)imide | 0.9 | LiPF$_6$ | 0.1 | Diallyl ethyl phosphate | 0.8 |
| Ex 2 | Lithium bis(fluorosulfonyl)imide | 0.7 | LiPF$_6$ | 0.3 | Diallyl ethyl phosphate | 0.8 |
| Ex 3 | Lithium bis(fluorosulfonyl)imide | 0.5 | LiPF$_6$ | 0.5 | Diallyl ethyl phosphate | 0.8 |
| Ex 4 | Lithium bis(fluorosulfonyl)imide | 0.3 | LiPF$_6$ | 0.7 | Diallyl propyl phosphate | 0.8 |
| Ex 5 | Lithium (methylsulfonyl)(trifluoromethylsulfonyl)imide | 0.3 | LiPF$_6$ | 0.7 | Diallyl propyl phosphate | 0.8 |
| Ex 6 | Lithium (methylsulfonyl)(trifluoromethylsulfonyl)imide | 0.7 | LiPF$_6$ | 0.3 | Diallyl propyl phosphate | 0.8 |
| Ex 7 | Lithium (methylsulfonyl)(trifluoromethylsulfonyl)imide | 0.7 | LiPF$_6$ | 0.3 | Diallyl propyl phosphate | 0.8 |
| Ex 8 | Lithium bis(fluorosulfonyl)imide | 0.7 | LiBF$_4$ | 0.3 | Diallyl ethyl phosphate | 0.8 |
| Ex 9 | Lithium bis(fluorosulfonyl)imide | 0.7 | LiPF$_6$ | 0.3 | Diallyl ethyl phosphate | 0.8 |
| Ex 10 | Lithium bis(fluorosulfonyl)imide | 0.7 | LiPF$_6$ | 0.3 | Diallyl ethyl phosphate | 0.8 |
| Ex 11 | Lithium bis(fluorosulfonyl)imide | 0.7 | LiPF$_6$ | 0.3 | Diallyl ethyl phosphate | 0.8 |
| Ex 12 | Lithium bis(fluorosulfonyl)imide | 0.7 | LiBF$_4$ | 0.3 | Propanedisulfonic acid anhydride | 1.1 |
| Ex 13 | Lithium bis(fluorosulfonyl)imide | 0.7 | LiBF$_4$ | 0.3 | PST | 1.0 |
| Ex 14 | Lithium bis(fluorosulfonyl)imide | 0.7 | LiBF$_4$ | 0.3 | PS | 0.84 |
| Ex 15 | Lithium bis(fluorosulfonyl)imide | 0.7 | LiBF$_4$ | 0.3 | Triallyl phosphate | 0.8 |
| Ex 16 | Lithium bis(fluorosulfonyl)imide | 0.7 | LiBF$_4$ | 0.3 | Compound of Formula 6-1 | 1.2 |
| Ex 17 | Lithium bis(fluorosulfonyl)imide | 0.7 | LiBF$_4$ | 0.3 | Compound of Formula 6-1 + PS | 1.2 |
| Ex 18 | Lithium bis(fluorosulfonyl)imide | 0.7 | LiPF$_6$ | 0.3 | Diallyl ethyl phosphate | 0.8 |
| Ex 19 | Lithium bis(fluorosulfonyl)imide | 0.7 | LiPF$_6$ | 0.3 | Diallyl ethyl phosphate | 0.8 |
| Ex 20 | Lithium bis(fluorosulfonyl)imide | 0.8 | LiPF$_6$ | 0.2 | Diallyl ethyl phosphate | 0.8 |
| Ex 21 | Lithium bis(fluorosulfonyl)imide | 0.8 | LiPF$_6$ | 0.2 | Diallyl ethyl phosphate | 0.8 |
| Ex 22 | Lithium bis(fluorosulfonyl)imide | 0.8 | LiPF$_6$ | 0.2 | Diallyl ethyl phosphate | 0.8 |
| CE 1 | / | / | LiPF$_6$ | 1 | Diallyl ethyl phosphate | 0.8 |
| CE 2 | Lithium bis(fluorosulfonyl)imide | 0.25 | LiPF$_6$ | 0.75 | Diallyl ethyl phosphate | 0.8 |
| CE 3 | Lithium bis(fluorosulfonyl)imide | 0.7 | LiPF$_6$ | 0.3 | Diallyl ethyl phosphate | / |
| CE 4 | Lithium bis(fluorosulfonyl)imide | 0.7 | LiPF$_6$ | 0.3 | Diallyl ethyl phosphate | 0.8 |
| CE 5 | Lithium bis(fluorosulfonyl)imide | 0.7 | LiPF$_6$ | 0.3 | Diallyl ethyl phosphate | 0.8 |

| Nos. | Additive A Content wt % | Organic solvents in mass ratio | Viscosity at room temperature mPa · s | Conductivity at 25° C. mS/cm |
|---|---|---|---|---|
| Ex 1 | 0.3 | EC:DEC = 30:70 | 3.6 | 9.3 |
| Ex 2 | 0.3 | EC:DEC = 30:70 | 3.8 | 8.9 |
| Ex 3 | 0.3 | EC:DEC = 30:70 | 3.9 | 8.8 |
| Ex 4 | 0.3 | EC:DEC = 30:70 | 4.0 | 8.7 |
| Ex 5 | 0.3 | EC:DEC = 30:70 | 4.0 | 8.7 |
| Ex 6 | 0.1 | EC:DEC = 30:70 | 3.7 | 8.9 |
| Ex 7 | 1 | EC:DEC = 30:70 | 3.7 | 8.9 |
| Ex 8 | 3 | EC:DEC = 30:70 | 3.7 | 8.9 |
| Ex 9 | 0.3 | EC:DEC = 30:70 | 3.7 | 8.9 |
| Ex 10 | 0.3 | EC:DEC = 30:70 | 3.7 | 8.9 |
| Ex 11 | 0.3 | EC:DEC = 30:70 | 3.8 | 8.9 |
| Ex 12 | 0.3 | EC:DEC = 30:70 | 3.7 | 8.9 |
| Ex 13 | 0.3 | EC:DEC = 30:70 | 3.7 | 8.9 |
| Ex 14 | 0.3 | EC:DEC = 30:70 | 3.7 | 8.9 |
| Ex 15 | 0.3 | EC:DEC = 30:70 | 3.7 | 8.9 |
| Ex 16 | 0.3 | EC:DEC = 30:70 | 3.7 | 8.9 |

TABLE 1-continued

| | | Composition of electrolyte | | |
|---|---|---|---|---|
| Ex 17 | 0.2 + 0.1 | EC:DEC = 30:70 | 3.7 | 8.9 |
| Ex 18 | 0.3 | EC:DEC = 35:65 | 4.0 | 8.9 |
| Ex 19 | 0.3 | EC:DEC:DMC = 30:50:20 | 3.1 | 8.9 |
| Ex 20 | 0.5 | EC:DEC = 40:60 | 4.9 | 9.0 |
| Ex 21 | 0.5 | EC:DMC = 30:70 | 2.0 | 9.2 |
| Ex 22 | 0.5 | EC:DEC:DMC = 32:52:16 | 3.4 | 9 |
| CE 1 | 0.3 | EC:DEC = 30:70 | 4.3 | 8.5 |
| CE 2 | 0.3 | EC:DEC = 30:70 | 4.1 | 8.7 |
| CE 3 | / | EC:DEC = 30:70 | 3.8 | 8.9 |
| CE 4 | 0.3 | EC:DEC = 30:70 | 3.8 | 8.9 |
| CE 5 | 0.3 | EC:DEC = 30:70 | 3.8 | 8.9 |

(Note:
"/" means no such substance was added)

TABLE 2

Properties of the positive electrode plate

| Nos. | Content of Cu element per unit area of current collector, g/m$^2$ | Positive electrode active material | Positive electrode plate Porosity | Infiltration coefficient of electrolyte to positive electrode plate, μg/s |
|---|---|---|---|---|
| Example 1 | 0.016 | $LiNi_{0.8}Co_{0.1}Mn_{0.1}O_2$ | 18% | 1.8 |
| Example 2 | 0.016 | $LiNi_{0.8}Co_{0.1}Mn_{0.1}O_2$ | 20% | 1.8 |
| Example 3 | 0.016 | $LiNi_{0.8}Co_{0.1}Mn_{0.1}O_2$ | 23% | 1.8 |
| Example 4 | 0.016 | $LiNi_{0.8}Co_{0.1}Mn_{0.1}O_2$ | 23% | 1.8 |
| Example 5 | 0.016 | $LiNi_{0.8}Co_{0.1}Mn_{0.1}O_2$ | 27% | 1.8 |
| Example 6 | 0.016 | $LiNi_{0.8}Co_{0.1}Mn_{0.1}O_2$ | 20% | 1.9 |
| Example 7 | 0.016 | $LiNi_{0.8}Co_{0.1}Mn_{0.1}O_2$ | 20% | 1.9 |
| Example 8 | 0.016 | $LiNi_{0.8}Co_{0.1}Mn_{0.1}O_2$ | 20% | 1.9 |
| Example 9 | 0.013 | $LiNi_{0.8}Co_{0.1}Mn_{0.1}O_2$ | 20% | 1.8 |
| Example 10 | 0.009 | $LiNi_{0.8}Co_{0.1}Mn_{0.1}O_2$ | 20% | 1.8 |
| Example 11 | 0.020 | $LiNi_{0.8}Co_{0.1}Mn_{0.1}O_2$ | 20% | 1.9 |
| Example 12 | 0.016 | $LiNi_{0.8}Co_{0.1}Mn_{0.1}O_2$ | 19% | 1.8 |
| Example 13 | 0.016 | $LiNi_{0.8}Co_{0.1}Mn_{0.1}O_2$ | 20% | 1.8 |
| Example 14 | 0.016 | $LiNi_{0.8}Co_{0.1}Mn_{0.1}O_2$ | 19% | 1.8 |
| Example 15 | 0.016 | $LiNi_{0.8}Co_{0.1}Mn_{0.1}O_2$ | 21% | 1.8 |
| Example 16 | 0.016 | $LiNi_{0.8}Co_{0.1}Mn_{0.1}O_2$ | 18% | 1.8 |
| Example 17 | 0.016 | $LiNi_{0.8}Co_{0.1}Mn_{0.1}O_2$ | 20% | 1.8 |
| Example 18 | 0.013 | $LiNi_{0.8}Co_{0.1}Mn_{0.1}O_2$ | 13% | 1.5 |
| Example 19 | 0.013 | $LiNi_{0.8}Co_{0.1}Mn_{0.1}O_2$ | 31% | 2.7 |
| Example 20 | 0.013 | $LiNi_{0.8}Co_{0.1}Mn_{0.1}O_2$ | 34% | 1.0 |
| Example 21 | 0.013 | $LiNi_{0.8}Co_{0.1}Mn_{0.1}O_2$ | 37% | 3.0 |
| Example 22 | 0.013 | $LiNi_{0.5}Mn_{1.5}O_4$ | 16% | 2.3 |
| Comparative example 1 | 0.016 | $LiNi_{0.8}Co_{0.1}Mn_{0.1}O_2$ | 20% | 1.3 |
| Comparative example 2 | 0.016 | $LiNi_{0.8}Co_{0.1}Mn_{0.1}O_2$ | 20% | 1.5 |
| Comparative example 3 | 0.016 | $LiNi_{0.8}Co_{0.1}Mn_{0.1}O_2$ | 20% | 1.8 |
| Comparative example 4 | 0.023 | $LiNi_{0.8}Co_{0.1}Mn_{0.1}O_2$ | 20% | 1.5 |
| Comparative example 5 | 0.007 | $LiNi_{0.8}Co_{0.1}Mn_{0.1}O_2$ | 20% | 1.5 |

TABLE 3

Results of battery performance

| | Volume expansion rate caused by gas production after storage at 80° C. (10 Days) | DCR at low temperature (mohm) | Number of cycles storage at 80° C. (10 Days) at 25° C. |
|---|---|---|---|
| Example 1 | 9% | 140 | 1800 |
| Example 2 | 13% | 163 | 1780 |
| Example 3 | 17% | 179 | 1820 |
| Example 4 | 20% | 198 | 1737 |
| Example 5 | 21% | 200 | 1740 |
| Example 6 | 23% | 189 | 1700 |
| Example 7 | 6% | 192 | 1730 |
| Example 8 | 4% | 270 | 1670 |
| Example 9 | 12% | 160 | 1750 |
| Example 10 | 12% | 152 | 1470 |
| Example 11 | 18% | 185 | 1790 |
| Example 12 | 18% | 181 | 1790 |

TABLE 3-continued

Results of battery performance

|  | Volume expansion rate caused by gas production after storage at 80° C. (10 Days) | DCR at low temperature (mohm) | Number of cycles storage at 80° C. (10 Days) at 25° C. |
|---|---|---|---|
| Example 13 | 18% | 176 | 1800 |
| Example 14 | 19% | 170 | 1790 |
| Example 15 | 10% | 178 | 1700 |
| Example 16 | 9% | 160 | 1710 |
| Example 17 | 10% | 150 | 1718 |
| Example 18 | 18% | 165 | 1785 |
| Example 19 | 14% | 138 | 1870 |
| Example 20 | 20% | 180 | 1740 |
| Example 21 | 12% | 123 | 1940 |
| Example 22 | 16% | 158 | 1810 |
| Comparative example 1 | 27% | 290 | 1620 |
| Comparative example 2 | 25% | 285 | 1640 |
| Comparative example 3 | 29% | 330 | 1593 |
| Comparative example 4 | 31% | 520 | 1480 |
| Comparative example 5 | 12% | 700 | 900 |

It can be known from the test results in Table 3 that compared with gas production performance after high-temperature storage and the DCR at low temperature obtained in the tests of Comparative Examples 1-5, the overall performance of Examples 1-22 were improved. It indicated that low-temperature power performance and high-temperature storage performance of the battery could be improved by using the specific fluorine-containing sulfonimide lithium salt as the first lithium salt and additive A and using a content of element copper atoms as an impurity per unit area of aluminum foil of a positive current collector within a specific range of from 0.009 g/m² to 0.021 g/m².

In Comparative Example 1 and Comparative Example 2, fluorine-containing organic lithium salt was not used as the primary lithium salt, the electrolytes had relatively low conductivity, and relatively poor stability, and thus the power performance and the gas production performance after storage of the electrolyte were relatively poor. In Comparative Example 3, no additive A was contained, resulting in direct contact between electrolyte comprising fluorine-containing sulfonimide lithium salt and the aluminum foil through the micropores between the cathode active particles, and thus corrosion of aluminum foil by electrolyte. On the other hand, a film cannot be formed on the cathode interface, so the decomposition of the electrolyte cannot be inhibited. Therefore, Comparative Example 3 exhibited relatively poor gas production performance after storage and power performance. In Comparative Example 4, the content of element copper atoms as the impurity per unit area of aluminum foil of the positive electrode current collector was too high, which accelerated the corrosion of the aluminum foil, promoted the oxidation and decomposition of the electrolyte and the deposition of decomposition products on the interface, thereby leading to higher impedance and deteriorating the power of the battery core; and promoted the decomposition of electrolyte to produce gas, thereby deteriorating the storage performance of the battery core. In Comparative Example 5, the content of element copper atoms as the impurity per unit area of aluminum foil of the positive electrode current collector was too low. Due to low mechanical strength of the current collector itself in Comparative Example 5, the elongation rate of the current collector was too high during the processing of the electrode plate, resulting in excessive stress generated in the current collector and poor conduction performance during the cycling of the battery, which caused an increased DRC and significantly deteriorated long-term cycle performance of the lithium-ion battery.

From the results of Examples 2 and 9 to 11, it can be further seen that under the same other conditions, the contents of element copper atoms as the impurity per unit area of aluminum foil of the positive electrode current collector was reduced from 0.016 g/m² and 0.013 g/m² to 0.009 g/m², gas production performance after high-temperature storage gradually remained stable, but the cycle performance continued to decline. Therefore, the content of element copper atoms as the impurity per unit area of aluminum foil is further optionally in a range of from 0.013 g/m² to 0.021 g/m², for example, about 0.016 g/m², so that an excellent balance between gas production performance after high-temperature storage and cycle performance of the battery is obtained.

In addition, the inventors found that under the same other conditions, using different fluorine-containing sulfonimide lithium salts (for example, using lithium methyl(trifluoromethylsulfonyl)imide or lithium bis(fluorosulfonyl)imide) as the first lithium salt had little effect on the performance of the battery. In particular, as shown in Example 4 and Example 5, under the same other conditions, when lithium methyl(trifluoromethylsulfonyl)imide or lithium bis(fluorosulfonyl)imide was used as the first lithium salt, the performance of the battery was basically the same.

The above results show that: the overall performance of the battery core can be effectively improved only by using fluorine-containing sulfonimide lithium salt in combination with additive A, and controlling the content of copper atoms as the impurity element per unit area of the aluminum foil of the positive electrode current collector within a specific range.

Those skilled in the art will understand that for the disclosed processes and/or methods, the functions performed in the processes and methods may be implemented in different orders. In addition, the outlined steps and operations are only provided as examples, and some of steps and operations may be optional, combined into fewer steps and operations, or expanded into additional steps and operations without detracting from the essence of the disclosed embodiments.

In addition, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those skilled in the art that virtually any disjunctive word and/or phrase presenting two or more alternative terms, whether in the description, claims, or drawings, should be understood to contemplate the possibilities of including one of the terms, either of the terms, or both terms.

For example, the phrase "A or B" will be understood to include the possibilities of "A" or "B" or "A and B."

In addition, where the features or aspects of the present disclosure are described in terms of the Markush group, those skilled in the art will recognize that the present disclosure is therefore also described in terms of any single member or subset of members of the Markush group. For reasons of convenience and/or patentability, it is expected that one or more members of a group may be included in or deleted from a group. Where any such inclusion or deletion occurs, the specification shall be deemed herein to include the group as modified thus fulfilling the written description of any and all Markush groups used in the appended claims.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to", "at least", and the like include the number recited and refer to ranges which can be subsequently broken down into subranges as discussed above. Finally, as will be understood by one skilled in the art, a range includes each individual member. Thus, for example, a group having 1-3 members refers to groups having 1, 2, or 3 members. Similarly, a group having 1-5 members refers to groups having 1, 2, 3, 4, or 5 members, and so forth.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

For the sake of brevity, only certain ranges are explicitly disclosed herein. However, any lower limit may be combined with any upper limit to form an unspecified range; and any lower limit may be combined with other lower limits to form an unspecified range; and in the same way, any upper limit may be combined with any other upper limit to form an unspecified range. Additionally, within a range includes every point or individual value between its end points even though not explicitly recited. Thus, every point or individual value may serve as its own lower or upper limit combined with any other point or individual value or any other lower or upper limit, to recite a range not explicitly recited. The ranges obtained by these combinations are all understood as being within the scope of the present disclosure.

Based on the disclosure and teaching of the foregoing specification, those skilled in the art to which this application belongs can also make appropriate changes and modifications to the foregoing embodiments. Therefore, this application is not limited to the specific implementations disclosed and described above, and some modifications and changes to this application should also fall within the protection scope of the claims of this application. Although specific terms are employed herein, they are used in a generic and descriptive sense only and not for purposes of limitation.

What is claimed is:

1. A lithium-ion battery, comprising a positive electrode plate, a negative electrode plate, an electrolyte and a separator, wherein:

the positive electrode plate comprises aluminum foil as a positive electrode current collector, and a content of element copper atom as an impurity per unit area of the aluminum foil is from 0.009 g/m$^2$ to 0.021 g/m$^2$, the electrolyte comprises a first lithium salt and an additive A, and the first lithium salt is a fluorine-containing sulfonimide lithium salt, and relative to total molar amount of lithium salt in the electrolyte, the fluorine-containing sulfonimide lithium salt has a molar amount of 30 mol % or higher; and the additive A is at least one of a phosphate compound containing an unsaturated bond, a cyclic compound containing a —SO$_2$— bond and a silicon-oxygen compound containing an unsaturated bond.

2. The lithium-ion battery according to claim 1, wherein: the additive A has a reduction potential in the electrolyte ranging from 1.2 V to 0.6 V.

3. The lithium-ion battery according to claim 1, wherein: the electrolyte has an infiltration coefficient on the surface of the positive electrode plate ranging from 0.9 μg/s to 3.0 μg/s.

4. The lithium-ion battery according to claim 1, wherein: the electrolyte has a viscosity at 25±3° C. of less than or equal to 5 mPa·s.

5. The lithium-ion battery according to claim 1, wherein: the fluorine-containing sulfonimide lithium salt is a lithium salt having Formula 1,

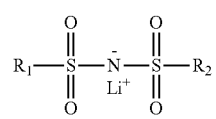

Formula 1 wherein R$_1$ and R$_2$ are each independently a fluorine atom, a hydrocarbon group having 1 to 8 carbon atoms or a hydrocarbon group having 1 to 8 carbon atoms substituted by fluorine, and at least one of R$_1$ and R$_2$ contains fluorine.

6. The lithium-ion battery according to claim 1, wherein: the phosphate compound containing an unsaturated bond comprises at least one of compounds of Formula 2,

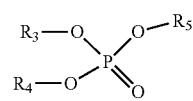

Formula 2 wherein R$_3$, R$_4$ and R$_5$ are each independently one selected from alkenyl, alkynyl, haloalkyl, haloalkenyl, haloalkynyl and alkyl groups having 1 to 6 carbon atoms, and aryl and haloaryl groups having 6 to 10 carbon atoms; and at least one of R$_3$, R$_4$ and R$_5$ contains an unsaturated bond.

7. The lithium-ion battery according to claim 1, wherein: the cyclic compound containing a —SO$_2$— bond is at least one of compounds of Formula 3 to Formula 5,

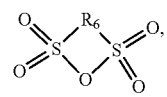

Formula 3

-continued

Formula 4
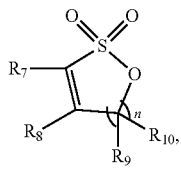

Formula 5
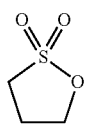

wherein $R_6$ is one selected from alkylene, alkenylene, alkynylene, halogenated alkylene, halogenated alkenylene, and halogenated alkynylene having 2 to 4 carbon atoms; and arylene and halogenated arylene having 6 to 10 carbon atoms;

$R_7$, $R_8$, $R_9$ and $R_{10}$ are each independently one selected from H, alkyl, alkenyl, alkynyl, haloalkyl, haloalkenyl, and haloalkynyl having 1 to 6 carbon atoms, and aryl and halogenated aryl having 6 to 10 carbon atoms; and n is 1, 2 or 3.

8. The lithium-ion battery according to claim 1, wherein: the silicon-oxygen compound containing an unsaturated branch chain is a compound of Formula 6, Formula 6
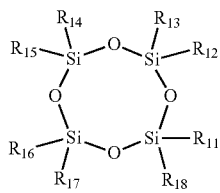

wherein $R_{11}$, $R_{12}$, $R_{13}$, $R_{14}$, $R_{15}$, $R_{16}$, $R_{17}$, and $R_{18}$ are each independently selected from hydrocarbon groups having 1 to 4 carbon atoms that are unsubstituted or substituted by a halogen element; and at least one of $R_{11}$, $R_{12}$, $R_{13}$, $R_{14}$, $R_{15}$, $R_{16}$, $R_{17}$, and $R_{18}$ contains an unsaturated bond.

9. The lithium-ion battery according to claim 1, wherein: relative to total weight of the electrolyte, mass percentage of the additive A is from 0.01 wt % to 5 wt %.

10. The lithium-ion battery according to claim 1, wherein: the electrolyte further comprises a second lithium salt, and the second lithium salt is one or more selected from $LiPF_6$, $LiBF_4$, $LiSbF_6$, $LiAsF_6$, $LiClO_4$, $LiN(C_2F_5SO_2)_2$, $LiN(CF_3SO_2)_2$, $CF_3SO_3Li$, $LiC(CF_3SO_2)_3$ and $LiB(C_2O_4)_2$, and optionally, molar ratio of the first lithium salt to the second lithium salt is in the range of from 1:1 to 20:1.

11. The lithium-ion battery according to claim 1, wherein: the positive electrode plate contains a positive electrode active material comprising at least one of compounds represented by Formula 7 to Formula 9:

$$Li_{1+x}Ni_aCo_bM_{1-a-b}O_{2-y}A_y \qquad \text{Formula 7}$$

$$Li_{1+x}Ni_aM'_{2-a}O_{4-y'}A_{y'} \qquad \text{Formula 8}$$

$$c[Li_2MnO_3]\cdot(1-c)[LiM''_2O_{2-y''}A_{y''}] \qquad \text{Formula 9}$$

wherein each A is independently one or more of S, N, F, Cl, Br and I;

in Formula 7, $-0.1 \leq x \leq 0.2$, $0.5 \leq a < 1$, $0.02 < b < 0.3$, $0.55 \leq a+b < 1$, $0 \leq y < 0.2$, M includes one or more of Mn, Fe, Cr, Ti, Zn, V, Al, Zr and Ce;

in Formula in Formula 8, $-0.1 \leq x' \leq 0.2$, $0.4 \leq a' < 0.6$, $0 < y' < 0.2$, M' comprises one or more of Mn, Fe, Cr, Ti, Zn, V, Al, Zr, Mg, and Ce; and in Formula 9, $0 < c < 1$, $0 \leq y'' < 0.2$, M'' is one or more of Ni, Co and Mn, Fe, Cr, Ti, Zn, V, Al, Zr and Ce.

12. A battery module comprising the lithium-ion battery according to claim 1.

13. A battery pack comprising the battery module according to claim 12.

14. A device comprising the lithium-ion battery according to claim 1.

15. The lithium-ion battery according to claim 5, wherein: $R_1$ and $R_2$ are each independently a fluorine atom, —$CH_3$, —$CF_3$, —$C_2F_5$, —$C_3F_7$, —$C_4F_9$ or —$CF_2CF_2OCF_2CF_3$.

16. The lithium-ion battery according to claim 6, wherein: $R_3$, $R_4$ and $R_5$ have at least one branch chain having an end of a carbon-carbon unsaturated bond.

17. The lithium-ion battery according to claim 16, wherein: all of branch chains in $R_3$, $R_4$ and $R_5$ have an end of a carbon-carbon unsaturated bond.

* * * * *